United States Patent
Hao et al.

(10) Patent No.: US 11,645,732 B2
(45) Date of Patent: May 9, 2023

(54) GRAPHICS PROCESSING UNIT HAVING PIXEL SHADER, OUTPUT MERGER, CACHE, MEMORY AND OPERATION METHOD THEREOF

(71) Applicant: Glenfly Tech Co., Ltd., Shanghai (CN)

(72) Inventors: Wenlin Hao, Shanghai (CN); Fengxia Wu, Shanghai (CN); Yuanfeng Wang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 44 days.

(21) Appl. No.: 17/467,280

(22) Filed: Sep. 6, 2021

(65) Prior Publication Data
US 2022/0309608 A1    Sep. 29, 2022

(30) Foreign Application Priority Data

Mar. 23, 2021  (CN) .......................... 202110308021.X
Mar. 23, 2021  (CN) .......................... 202110308083.0

(51) Int. Cl.
G06T 1/20       (2006.01)
G06T 11/00      (2006.01)
G06T 1/60       (2006.01)

(52) U.S. Cl.
CPC ................. *G06T 1/20* (2013.01); *G06T 1/60* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 2016/0284120 A1* | 9/2016 | Hasselgren | G06V 10/44 |
| 2020/0082492 A1* | 3/2020 | Wang | G06T 1/20 |
| 2021/0192825 A1* | 6/2021 | Pillai | G06T 15/503 |
| 2021/0192827 A1* | 6/2021 | Saleh | G06T 1/20 |
| 2021/0209827 A1* | 7/2021 | Bhiravabhatla | G06T 1/60 |

* cited by examiner

*Primary Examiner* — Patrick F Valdez
(74) *Attorney, Agent, or Firm* — JCIPRNET

(57) ABSTRACT

A graphics processing unit includes a pixel shader, an output merger, a cache, and a memory. The pixel shader is configured to output a pixel data. The output merger is coupled to the pixel shader and configured to receive the pixel data. The output merger outputs the pixel data and a sample mask corresponding to the pixel data. The cache is coupled to the output merger and configured to receive the pixel data and the sample mask. The cache generates a sample data according to the pixel data and the sample mask. The memory is coupled to the cache. The cache writes the sample data into the memory. A data size of the sample data is a multiple of a data size of the pixel data. An operation method thereof is also provided.

40 Claims, 6 Drawing Sheets

GRAPHICS PROCESSING UNIT HAVING PIXEL SHADER, OUTPUT MERGER, CACHE, MEMORY AND OPERATION METHOD THEREOF

CROSS-REFERENCE TO RELATED APPLICATION

This application claims the priority benefits of Chinese application no. 202110308021.X, filed on Mar. 23, 2021 and Chinese application no. 202110308083.0, filed on Mar. 23, 2021. The entirety of each of the above-mentioned patent applications is hereby incorporated by reference herein and made a part of the specification.

BACKGROUND

Technical Field

The disclosure relates to a processor; particularly, the disclosure relates to a graphics processing unit and an operation method thereof.

Description of Related Art

In the field of image display, in order to eliminate jagged edges (i.e., geometry aliasing) of geometric objects in an image, technologies such as multisampling anti-aliasing (MSAA) and supersampling anti-aliasing (SSAA) are often adopted for general graphics processing units. For example, when multisampling anti-aliasing is required to be performed, the graphics processing unit samples a plurality of sub-sampling points of each pixel, performs coloring calculations on each of the sub-sampling points, and synthesizes a final image to eliminate the jagged edges.

However, when performing the multisampling anti-aliasing, since the graphics processing unit requires to sample (i.e., upsample) the sub-sampling points of each pixel and perform coloring calculation on the sub-sampling points, this causes the sampling data to increase exponentially, and increases a data transmission bandwidth between the graphics processing unit and the cache (or "memory"). In addition, it is required to perform coloring calculations on each of the sub-sampling points, wasting coloring resources of the graphics processing unit.

How to effectively reduce the data traffic of the data bus of the cache during the multisampling/supersampling, save the bandwidth, and/or save the computing resources of the graphics processing unit is an issue to be addressed in the related field.

SUMMARY

The disclosure is directed to a graphics processing unit and an operation method thereof, where a data traffic of a data bus between the graphics processing unit and a cache is effectively reduced and a bandwidth is saved by generating sample data in the cache according to pixel data and a sample mask. The disclosure is also directed to another graphics processing unit and an operation method thereof, where computing resources of an arithmetic logic unit in a graphics controller are effectively saved by determining whether to output pixel data or sample data to an output merger according to a pixel plane status in a cache, and updating or maintaining the pixel plane status.

According to an embodiment of the disclosure, a graphics processing unit includes a pixel shader, an output merger, a cache, and a memory. The pixel shader is configured to output a pixel data. The output merger is coupled to the pixel shader and configured to receive the pixel data. The output merger outputs the pixel data and a sample mask corresponding to the pixel data. The cache is coupled to the output merger and configured to receive the pixel data and the sample mask. The cache generates a sample data according to the pixel data and the sample mask. The memory is coupled to the cache. The cache writes the sample data into the memory. A data size of the sample data is a multiple of a data size of the pixel data.

According to an embodiment of the disclosure, an operation method of a graphics processing unit includes the following steps. A pixel data is output by a pixel shader. The pixel data is received by an output merger. The pixel data and a sample mask corresponding to the pixel data are output by the output merger. The pixel data and the sample mask are received by a cache, and a sample data is generated by the cache according to the pixel data and the sample mask. In addition, the sample data is written into a memory by the cache, where a data size of the sample data is a multiple of a data size of the pixel data.

According to an embodiment of the disclosure, a graphics processing unit includes a pixel shader, an output merger, and a cache. The pixel shader is configured to output a pixel frequency source data. The output merger is coupled to the pixel shader and configured to receive the pixel frequency source data. The cache coupled to the output merger and configured to pre-record a pixel plane status of a cache line corresponding to a current render target. The cache determines whether to output a pixel data or a sample data to the output merger according to the pixel plane status, a data size of the sample data is a multiple of a data size of the pixel data, and the output merger updates or maintains the pixel plane status.

According to an embodiment of the disclosure, an operation method of a graphics processing unit includes the following steps. A pixel plane status of a cache line corresponding to a current render target is pre-recorded by a cache. A pixel frequency source data is output by a pixel shader. The pixel frequency source data is received by an output merger. It is determined by the cache whether to output a pixel data or a sample data to the output merger according to the pixel plane status, where a data size of the sample data is a multiple of a data size of the pixel data. In addition, the pixel plane status is updated or maintained by the output merger.

Based on the foregoing, in the graphics processing unit and the operation method thereof according to some embodiments of the disclosure, the pixel data and the sample mask are directly output by the output merger to the cache, effectively reducing the data traffic of the data bus between the output merger and the cache. In the graphics processing unit and the operation method thereof according to some embodiments of the disclosure, it is determined whether to output the pixel data or the sample data to the output merger by the cache by determining the pixel plane status, effectively saving the computing resources of the arithmetic logic unit in the graphics controller.

The disclosure may be understood with reference to the following detailed description in conjunction with the accompanying drawings. It should be noted that, for ease of understanding by readers and conciseness of the drawings, the plurality of figures in the disclosure merely show a part of a display device, and specific components in the drawings are not drawn to scale. Besides, the number and size of each component in the figures only serve for exemplifying, instead of defining or limiting the scope of the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to make the aforementioned more comprehensible, several embodiments accompanied with drawings are described in detail as follows.

The same names are used to represent the same components in the specification and the claims. Secondly, some terms are used to refer to specific components in the specification and the claims. A person skilled in the art should understand that a hardware manufacturer may use different names to refer to the same components. The specification and the claims are not intended to distinguish components by the difference in names but by the difference in the functions. Further, the term "coupling" mentioned in the whole specification and the claims includes any direct and indirect connection means in this specification. Finally, the terms such as "include", "comprise", and "have" mentioned in the whole specification and the claims are open-ended terms, and should be interpreted as "including, but not limited to".

Figure 1:
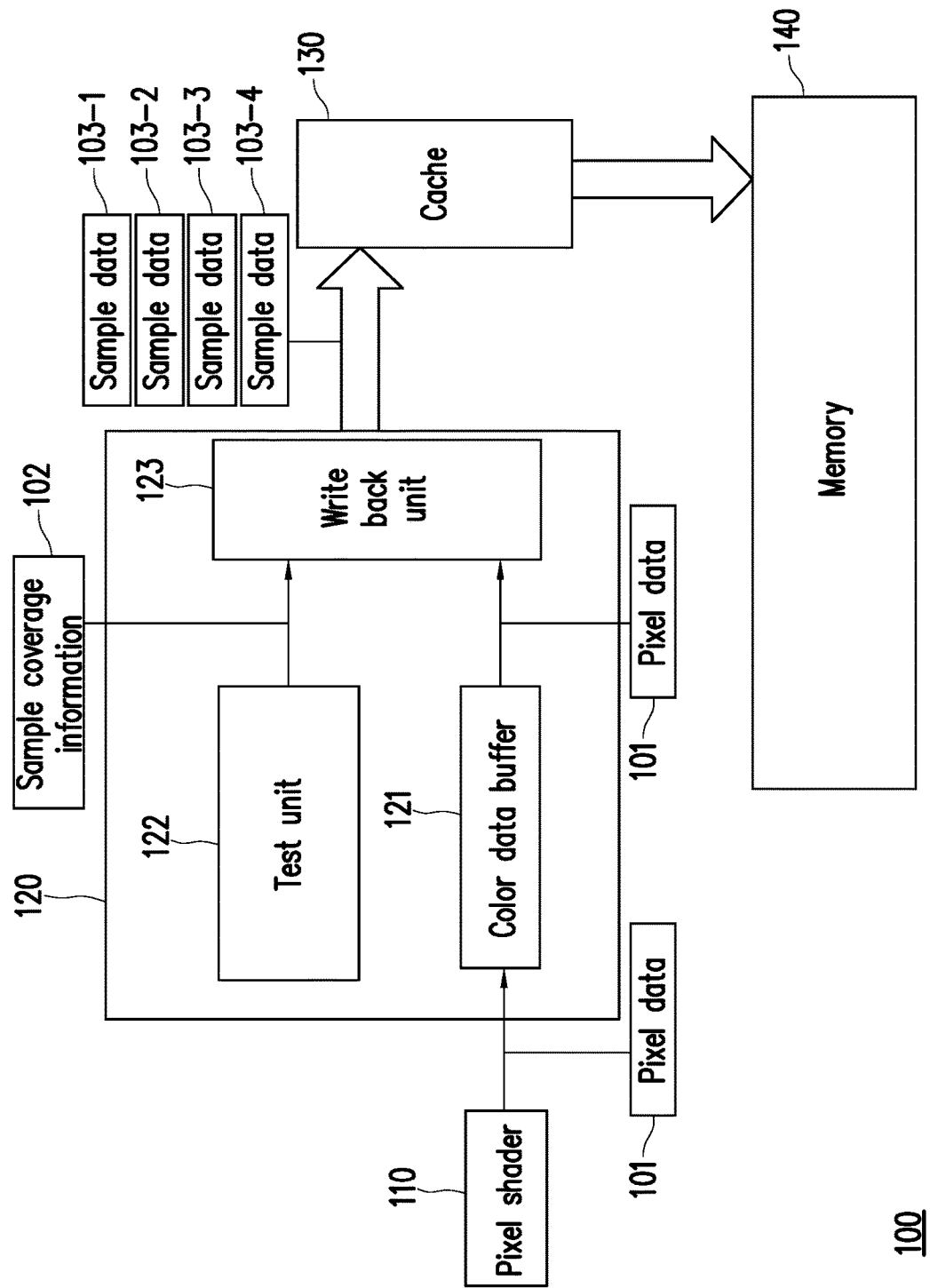
FIG. 1 is a schematic diagram of a graphics processing unit according to an embodiment of the disclosure.

FIG. 1 is a schematic diagram of a graphics processing unit according to an embodiment of the disclosure. As shown in FIG. 1, a graphics processing unit 100 includes a pixel shader 110, an output merger 120, a cache 130, and a memory 140. The output merger 120 is coupled to the pixel shader 110 and the cache 130. The output merger 120 may receive a pixel data 101 (i.e., a pixel data 101 after rasterization) transmitted from the pixel shader 110, and write the pixel data 101 as sample data 103-1 to 103-4 corresponding to sub-sampling points according to sample coverage information 102 (results of coverage tests and depth and transparency tests). The output merger 120 may transmit the sample data 103-1 to 103-4 of the sub-sampling points to the cache 130. The cache 130 is coupled to the memory 140. The cache 130 receives the sample data 103-1 to 103-4 of the sub-sampling points transmitted from the output merger 120, and stores them in the memory 140. Herein in the embodiments in this description, the cache 130 includes a level 1 (L1) cache, but the disclosure is not limited to this.

Specifically, the output merger 120 further includes a color data buffer 121, a test unit 122, and a write back unit 123. The color data buffer 121 receives the pixel data 101 of a pixel shading result output from the pixel shader 110, and transmits the pixel data 101 to the write back unit 123. Taking a 4-time (4×) multisampling anti-aliasing (MSAA) graphics processing (i.e., each pixel corresponding to four sub-sampling points) as an example, the test unit 122 further obtains the sample coverage information 102 (the results of coverage tests and depth and the transparency tests) of the plurality of sub-sampling points, and generates a sample mask (not shown in FIG. 1). The write back unit 123 is coupled to the color data buffer 121 and the test unit 122. The write back unit 123 receives the pixel data 101 transmitted from the color data buffer 121 and the sample coverage information 102 transmitted from the test unit 122, and writes the pixel data 101 as the sample data 103-1 to 103-4 corresponding to the sub-sampling points according to the sample coverage information 102.

Notably, the write back unit 123 also generates a corresponding byte mask (not shown in FIG. 1) according to the sample mask to write the sample data into the memory 140 according to the byte mask in the process of data writing by the cache 130. For a more detailed description and explanation of the sample mask, reference may be made to FIG. 2, Table 5, and Table 6, which will not be repeatedly described herein.

Also notably, for the convenience of illustration, the sample data 103-1 to 103-4 as shown in FIG. 1 are illustrated between the output merger 120 and the cache 130. However, those skilled in the art should understand that the sample data 103-1 to 103-4 are the data amount that requires to be transmitted between the output merger 120 and the cache 130 after the graphics processing unit 100 performs an upsampling of multisampling anti-aliasing. In other words, when the graphics processing unit performs multisampling anti-aliasing, the corresponding data amount that requires to be transmitted also increases exponentially, greatly consuming a transmission bandwidth of a data bus.

Lastly, when the graphics processing unit 100 determines that it is required to perform image blending on the sample data 103-1 to 103-4, the output merger 120 needs to further read the sample data 103-1 to 103-4 from the memory 140 with the cache 130 to perform the blending. In other words, the upsampled sample data 103-1 to 103-4 in the 4-time (4×) multisampling anti-aliasing cause a huge waste of the data bus bandwidth when being written into/read from the memory 140, affecting the transmission efficiency.

Figure 2:
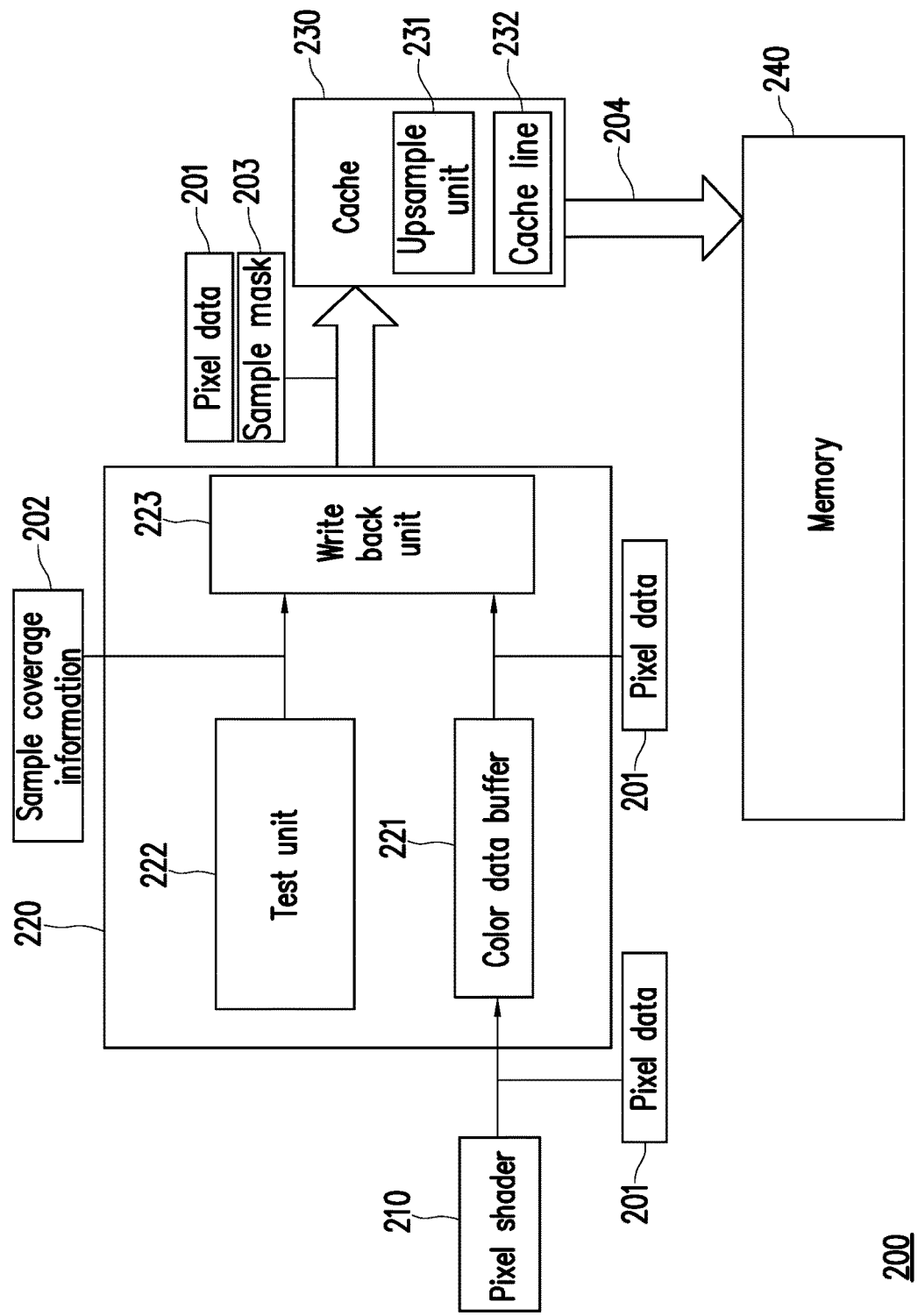
FIG. 2 is a schematic diagram of a graphics processing unit according to another embodiment of the disclosure.

FIG. 2 is a schematic diagram of a graphics processing unit according to another embodiment of the disclosure. With reference to FIG. 2, a graphics processing unit 200 includes a pixel shader 210, an output merger 220, a cache 230, and a memory 240. The output merger 220 is coupled to the pixel shader 210. The cache 230 is coupled to the output merger 220. The memory 240 is coupled to the cache 230. The output merger 220 includes a color data buffer 221, a test unit 222, and a write back unit 223. The cache 230 includes an upsample unit 231 and a cache line 232. In this embodiment, the graphics processing unit 200 may include multiple controller circuits, register circuits, and logical operation circuits, etc., to form the various units, modules, and relevant functional components mentioned in the embodiments of the disclosure.

In this embodiment, the graphics processing unit 200 is adapted for performing graphics processing in a multisampling anti-aliasing mode. The color data buffer 221 receives a pixel data 201 from the pixel shader 210 and provides the pixel data 201 to the write back unit 223. The test unit 222 outputs sample coverage information 202 to the write back unit 223. The write back unit 223 of the output merger 220 obtains a sample mask 203 according to the sample coverage information 202, and outputs the pixel data 201 and the sample mask 203 to the upsample unit 231 of the cache 230.

In this embodiment, the test unit 222 may include a depth and transparency test unit, but the disclosure is not limited to this.

In this embodiment, the pixel data 201 is a render target (RT) data, and a data size of the pixel data 201 is determined according to a render target format. The data size of the pixel data 201 output at each time by the pixel shader 210, for example, is shown in Table 1 below. In other words, one pixel data described in this embodiment may be 8×2$^n$ bits, where n is an integer greater than or equal to zero.

TABLE 1

| Render target format | Data size of the pixel data output at each time by the pixel shader |
|---|---|
| R8-UNORM | 8 bits |
| R8G8-UNORM | 16 bits |
| R8G8B8A8-UNORM | 32 bits |
| R16G16B16A16-FLOAT | 64 bits |
| R32G32B32A23-FLOAT | 128 bits |

In this embodiment, the write back unit 223 does not duplicate the pixel data 201, but directly outputs the pixel data 201 and the sample mask 203 of the sample coverage information 202 to the upsample unit 231 of the cache 230. In this embodiment, the upsample unit 231 of the cache 230 may generate a sample data 204 according to the pixel data 201, the sample mask 203, and the render target format, and the sample data 204 may include multiple pieces of data duplicated by the pixel data 201. The upsample unit 231 of the cache 230 inputs the sample data 204 to the cache line 232 of the cache 230 to wait for being written into the memory 240.

In this embodiment, a data size of the sample data 204 is determined according to the multisampling anti-aliasing mode and the render target format. In this regard, the data size of the sample data 204 is a multiple of the data size of the pixel data 201, and the multiple is equal to an amplification multiple of the multisampling anti-aliasing mode. With reference to Table 2 below, for example, if the render target format of the pixel data 201 is "R8G8B8A8-UNORM" as shown in Table 1, and the multisampling anti-aliasing mode is a 4-time multisampling, then the data size of the sample data is 128 bits (i.e., 32 bits multiplied by 4). Compared to FIG. 1, the write back unit 223 of this embodiment outputs the pixel data 201 and the sample mask 203 of respectively 32 bits and 4 bits to the upsample unit 231 of the cache 230, instead of outputting the sample data of 128 bits (or 16 bytes) and the byte mask of 16 bits to the cache 230. Therefore, in the graphics processing unit 200 of this embodiment, the data traffic of the data bus between the output merger 220 and the cache 230 during the upsampling on the graphics is effectively reduced.

TABLE 2

| Multisampling anti-aliasing mode | 1 time | 2 times | 4 times | 8 times | 16 times |
|---|---|---|---|---|---|
| Render target format | | | | | |
| R8-UNORM | 8 bits | 16 bits | 32 bits | 64 bits | 128 bits |
| R8G8-UNORM | 16 bits | 32 bits | 64 bits | 128 bits | 256 bits |
| R8G8B8A8-UNORM | 32 bits | 64 bits | 128 bits | 256 bits | 512 bits |
| R16G16B16A16-FLOAT | 64 bits | 128 bits | 256 bits | 512 bits | 1024 bits |
| R32G32B32A23-FLOAT | 128 bits | 256 bits | 512 bits | 1024 bits | 2048 bits |

Figures 3, 4:
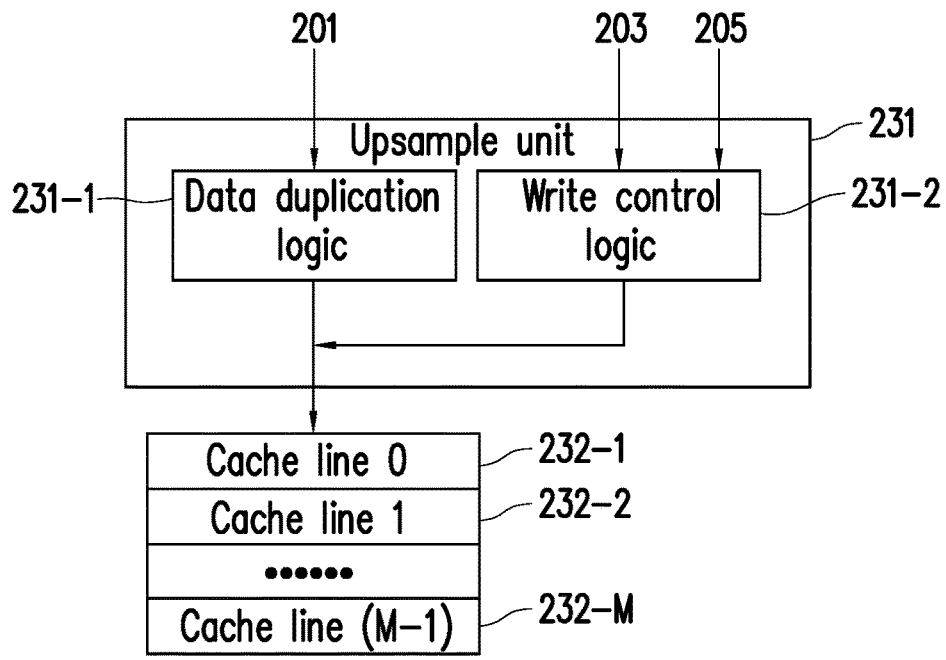
FIG. 3 is a schematic diagram of an upsample unit according to an embodiment of the disclosure.
FIG. 4 is a schematic diagram of data writing into a cache line according to an embodiment of the disclosure.

FIG. 3 is a schematic diagram of an upsample unit according to an embodiment of the disclosure. FIG. 4 is a schematic diagram of data writing into a cache line according to an embodiment of the disclosure. With reference to FIG. 2 to FIG. 4, in this embodiment, the upsample unit 231 of the cache 230 includes a data duplication logic 231-1 and a write control logic 231-2. The data duplication logic 231-1 receives the pixel data 201, and the write control logic 231-2 receives the sample mask 203 and a render target format 205. The render target format 205 may be provided by the output merger 220 or provided by a render register (not shown) of the graphics processing unit 200. In this embodiment, the write control logic 231-2 controls the data duplication logic 231-1 to duplicate the pixel data 201 according to the sample mask 203 and the render target format 205, and sequentially input cache lines 232-1 to 232-M of the cache 230, where M is a positive integer.

Taking a 4-time (4×) multisampling anti-aliasing graphics processing as an example, and assuming that a data content of the pixel data 201 is "0x3f05221e", a data content of the sample mask 203 is "b'1101", and the render target format 205 is "R8G8B8A8-UNORM" (32bits), then, as shown in FIG. 4, in the 16 bytes of the cache line 232-1, each 4 bytes corresponds to one of samples 432-1 to 432-4, and the 4 bytes corresponding to the part where the data of the sample mask 203 is "1" of each of the samples 432-1, 432-3, and 432-4 are written into the 32-bit data of the pixel data 201. The 4 bytes corresponding to the part where the data of the sample mask 203 is "0" of the sample 432-2 is not written into the data, and will be maintained as the original data (the symbol "?" in the Figure representing being maintained as the original data). Therefore, the data contents of the samples 432-1 to 432-4 are the result of the sample data 204 as stored in the cache line 232-1. In other words, compared to FIG. 1, the upsample unit 231 of the cache 230 of this embodiment only requires to obtain the pixel data 201 of 32 bits from the output merger 220. Therefore, compared to the cache 130 of FIG. 1, which requires to obtain the sample data of 16 bytes (or 128 bits) from the output merger 120, in the graphics processing unit 200 of this embodiment, the data traffic of the data bus between the output merger 220 and the cache 230 is effectively reduced.

Figure 5:
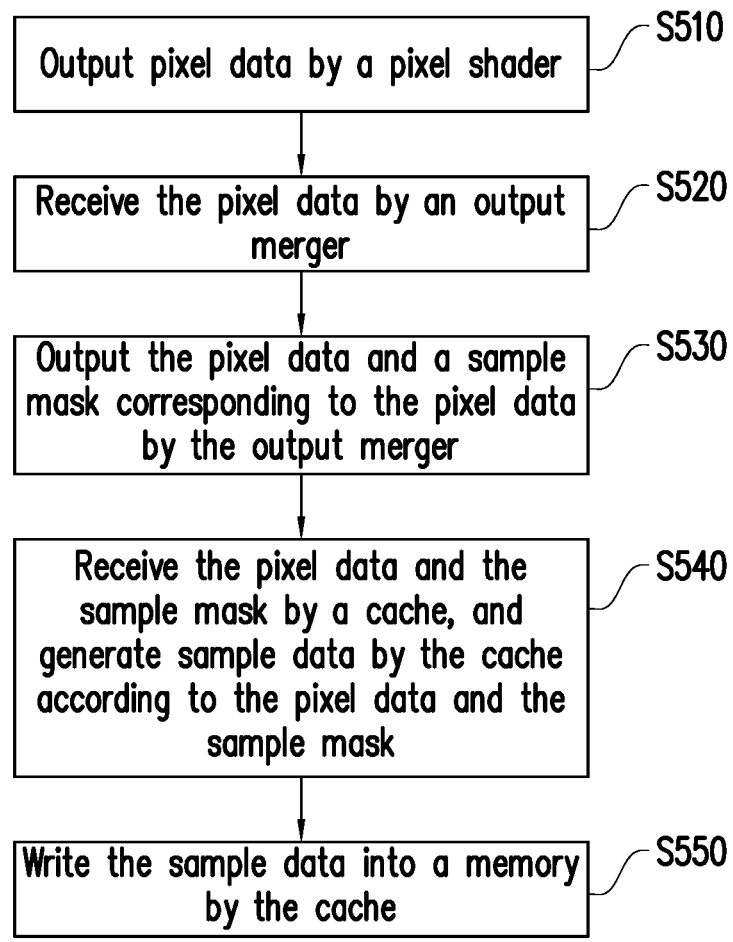
FIG. 5 is a flowchart of an operation method of a graphics processing unit according to an embodiment of the disclosure.

FIG. 5 is a flowchart of an operation method of a graphics processing unit according to an embodiment of the disclosure. With reference to FIG. 2 and FIG. 5, the operation method of this embodiment is applicable to at least the graphics processing unit 200 of FIG. 2. In step S510, the pixel shader 210 outputs the pixel data 201. In step S520, the output merger 220 receives the pixel data 201. In step S530, the output merger 220 outputs the pixel data 201 and the sample mask 203 corresponding to the pixel data 201. In step S540, the cache 230 receives the pixel data 201 and the sample mask 203, and the cache 230 generates the sample data 204 according to the pixel data 201 and the sample mask 203. In step S550, the cache 230 writes the sample data 204 into the memory 240. Therefore, in the operation method of this embodiment, the data traffic of the data bus between the output merger 220 and the cache 230 is effectively reduced. However, for other component features, technical details, and implementations of the graphics processing unit 200, reference may be made to the description of the embodiments of FIG. 2 to FIG. 4 to obtain sufficient teachings, suggestions, and implementation descriptions, which therefore will not be repeated.

Figure 6:
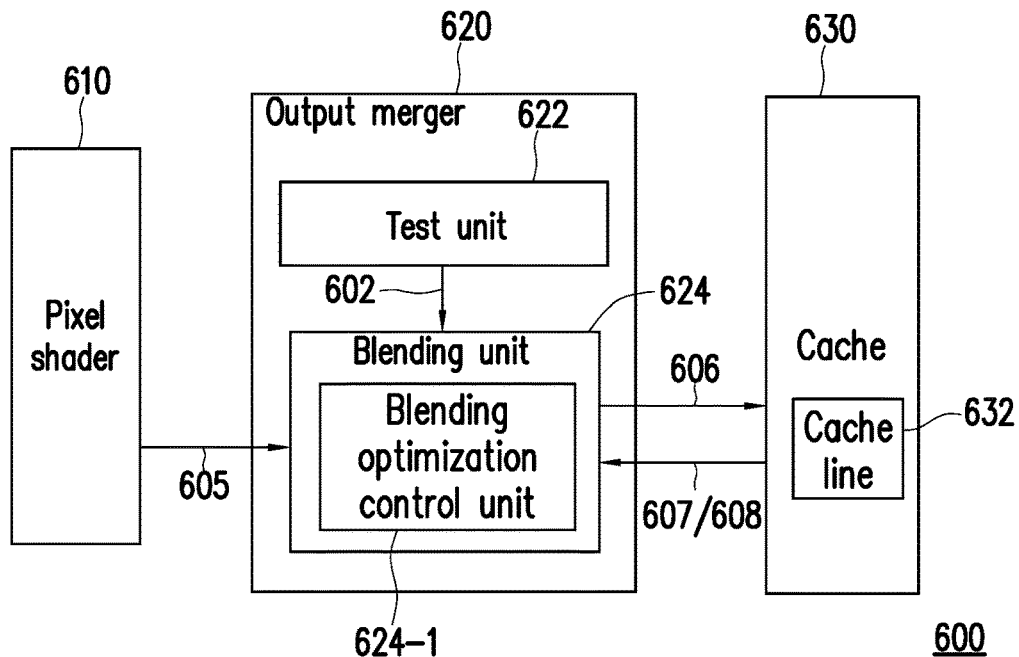
FIG. 6 is a schematic diagram of a graphics processing unit according to another embodiment of the disclosure.

FIG. 6 is a schematic diagram of a graphics processing unit according to another embodiment of the disclosure. With reference to FIG. 6, a graphics processing unit 600 includes a pixel shader 610, an output merger 620, and a cache 630. In this embodiment, the graphics processing unit 600 is adapted for performing graphics processing in a multisampling anti-aliasing mode. In this embodiment, the cache 630 includes a level 1 cache, but the disclosure is not limited to this. Notably, in an embodiment, the graphics processing unit 600 may also include the memory 240 of the embodiment of FIG. 2, the output merger 620 may also include the color data buffer 221 and the write back unit 223 of the embodiment of FIG. 2, and the cache 630 may also include the upsample unit 231 of the embodiment of FIG. 2. In this regard, in addition to independently realizing the following relevant data reading operations, the graphics processing unit 600 of this embodiment may also implement the relevant data writing operations of FIG. 2 to FIG. 5 as mentioned above in combination. In other words, in an embodiment, the graphics processing unit 600 may first generate the sample data and store it in the memory according to the embodiments of FIG. 2 to FIG. 5, and then read the sample data according to the following embodiments of FIG. 6 to FIG. 8.

In this embodiment, the pixel shader 610 outputs a pixel frequency source data 605 to the output merger 620. The output merger 620 is coupled to the pixel shader 610. The output merger 620 receives the pixel frequency source data 605. The cache 630 is coupled to the output merger 620. The cache 630 pre-records a pixel plane status of a cache line 632 corresponding to a current render target. In this embodiment, the output merger 620 includes a test unit 622 and a blending unit 624. The blending unit 624 includes a blending optimization control unit 624-1.

The test unit 622 outputs sample coverage information 602 (which may be the same as the sample coverage information 202). The blending unit 624 is coupled to the test unit 622. The blending optimization control unit 624-1 receives the sample coverage information 602 and the pixel frequency source data 605. In this embodiment, the blending optimization control unit 624-1 determines a merger status data and a coverage extent data according to the sample coverage information 602 and the pixel frequency source data 605. In addition, the blending optimization control unit 624-1 determines whether to output update information 606 to the cache 630 or not according to the merger status data and the coverage extent data to update the pixel plane status.

Notably, in this embodiment, the pixel shader 610 operates at a pixel frequency, and thus the merger status data may first be set to a 1-bit data. In this regard, when the merger status data is of a first data type (e.g., "1"), it means that the output merger 620 operates at the pixel frequency. When the merger status data is of a second data type (e.g., "0"), it means that the output merger 620 operates at a sample frequency. In this embodiment, the coverage extent data may be a 1-bit data. When each of a plurality of samples in the sample coverage information 602 is defined to have an identical coverage configuration, the coverage extent data may be represented by the first data type (e.g., "1"). When the samples in the sample coverage information 602 have different coverage configurations, the coverage extent data may be represented by the second data type (e.g., "0"). In this embodiment, the pixel plane status may be a 1-bit data. When a plurality of samples of each pixel stored in the cache line 632 of the cache 630 each have the pixel data that are identical, the pixel plane status may be represented by the first data type (e.g., "1"), and when the samples of each pixel stored in the cache line 632 of the cache 630 have the pixel data that are different, the pixel plane status may be represented by the second data type (e.g., "0"). Notably, the pixel plane status may be stored in at least one of the output merger 620 and the cache 630, and is determined corresponding to the data content currently stored in the cache line 632 of the cache 630. The coverage extent data is directly determined by the current sample coverage information 602. The merger status data may be jointly controlled and determined by the coverage extent data and the pixel plane status. The merger status data is configured to determine whether the output merger 620 is currently operating at the pixel frequency or the sample frequency, and is configured to update the pixel plane status.

For example, with reference to Table 3 below, which shows the data content corresponding to two pixels (pixel 1, pixel 0) stored in one cache line. In Table 3, sample 0 to sample 3 of the pixel 0 have the same pixel data "0x7e38", and sample 0 to sample 3 of pixel 1 have the same pixel data "0x850c". Therefore, when the data (pixel plane) as in Table 3 below is stored in the cache line 632 of the cache 630, the current pixel plane status recorded by the cache line 632 may be, for example, a data value of "1". In contrast, with reference to Table 4 below, which shows the data content corresponding to other two pixels (pixel 1', pixel 0') stored in one cache line 632. In Table 4, sample 0 to sample 3 of pixel 0' have the same pixel data "0x7e38", while a pixel data "0x00fb" of sample 1 of pixel 1' is different from a pixel data "0x850c" of other samples. Therefore, when the data as in Table 4 below is stored in the cache line 632 of the cache 630, the current pixel plane status recorded by the cache line 632 may be, for example, a data value of "0".

TABLE 3

| Pixel 1 | | | | Pixel 0 | | | |
|---|---|---|---|---|---|---|---|
| Sample 3 | Sample 2 | Sample 1 | Sample 0 | Sample 3 | Sample 2 | Sample 1 | Sample 0 |
| 0x850c | 0x850c | 0x850c | 0x850c | 0x7e38 | 0x7e38 | 0x7e38 | 0x7e38 |

TABLE 4

| Pixel 1' | | | | Pixel 0' | | | |
|---|---|---|---|---|---|---|---|
| Sample 3 | Sample 2 | Sample 1 | Sample 0 | Sample 3 | Sample 2 | Sample 1 | Sample 0 |
| 0x850c | 0x850c | 0x00fb | 0x850c | 0x7e38 | 0x7e38 | 0x7e38 | 0x7e38 |

For another example, with reference to Table 5 below, which shows two sample masks obtained by the blending optimization control unit 624-1 from the sample coverage information 602 provided by the test unit 622. The two sample masks may, for example, correspond to two pixels (pixel 1, pixel 0) stored in one cache line 632. In Table 5, sample 0 to sample 3 of pixel 0 corresponding to the sample mask of pixel 0 have the same data value of "0" (indicating that the sample 0 to the sample 3 of the pixel 0 are not data-covered), and sample 0 to sample 3 of pixel 1 corresponding to the sample mask of pixel 1 have the same pixel data of "1" (indicating that the sample 0 to the sample 3 of the pixel 1 are each data-covered). Therefore, when the blending optimization control unit 624-1 obtains the sample coverage information as shown in Table 5 below, the coverage extent data recorded by the blending optimization control unit 624-1 may be, for example, the data value of "1". In contrast, with reference to Table 6 below, which shows other two sample masks obtained by the blending optimization control unit 624-1 from the sample coverage information 602 provided by the test unit 622. These other two sample masks may, for example, correspond to two pixels (pixel 1', pixel 0') stored in one cache line 632. In Table 6, although sample 0 to sample 3 of pixel 1' corresponding to the sample mask of pixel 1 have the same pixel data of "1" (indicating that the sample 0 to the sample 3 of the pixel 1 are each data-covered), the data value of "1" corresponding to sample 2 in the sample mask of pixel 0' is different from the data value of "0" corresponding to other samples (indicating that the sample 0, the sample 1, and the sample 3 of the pixel 0 are not data-covered, while sample 2 is data-covered). Therefore, when the blending optimization control unit 624-1 obtains the sample coverage information as shown in Table 6 below, the coverage extent data recorded by the blending optimization control unit 624-1 may be, for example, the data value of "0".

TABLE 5

| Sample mask of pixel 1 | | | | Sample mask of pixel 0 | | | |
|---|---|---|---|---|---|---|---|
| Sample 3 | Sample 2 | Sample 1 | Sample 0 | Sample 3 | Sample 2 | Sample 1 | Sample 0 |
| 1 | 1 | 1 | 1 | 0 | 0 | 0 | 0 |

TABLE 6

| Sample mask of pixel 1' | | | | Sample mask of pixel 0' | | | |
|---|---|---|---|---|---|---|---|
| Sample 3 | Sample 2 | Sample 1 | Sample 0 | Sample 3 | Sample 2 | Sample 1 | Sample 0 |
| 1 | 1 | 1 | 1 | 0 | 1 | 0 | 0 |

In this embodiment, the pixel shader 610 operates at the pixel frequency, and the output merger 620 and the cache 630 adjust the output merger 620 to operate at the pixel frequency or the sample frequency according to the pixel plane status. Specifically, in an implementation scenario where the pixel plane status and the coverage extent data are of the first data type (e.g., "1"), the merger status data is of the first data type (e.g., "1"). The cache 630 returns the pixel plane status with the pixel data of the first data type to the output merger 620. At this time, the output merger 620 operates at the pixel frequency and performs pixel blending on the pixel data. Then, the output merger 620 outputs a data with a merging result on a pixel plane to the cache 630, and maintains the pixel plane status at the first data type (e.g., "1").

In another implementation scenario where the pixel plane status is of the first data type and the coverage extent data is of the second data type, the merger status data is of the first data type. The cache 630 returns the pixel plane status with the pixel data of the first data type (e.g., "1") to the output merger 620. At this time, the output merger 620 operates at the pixel frequency and performs pixel blending on the pixel data. Then, the output merger 620 outputs a data with a merging result on the pixel plane to the cache 630, and updates the pixel plane status to the second data type (e.g., "0").

In yet another implementation scenario where the pixel plane status is of the second data type (e.g., "0"), the merger status data is of the second data type (e.g., "0"). The cache 630 returns the pixel plane status of the second data type (e.g., "0") to the output merger 620. At this time, the output merger 620 operates at the sample frequency, and performs pixel blending on the sample data. The output merger 620 outputs a data with a merging result on a sample plane to the cache 630, and maintains the pixel plane status at the second data type (e.g., "0").

Figure 7:
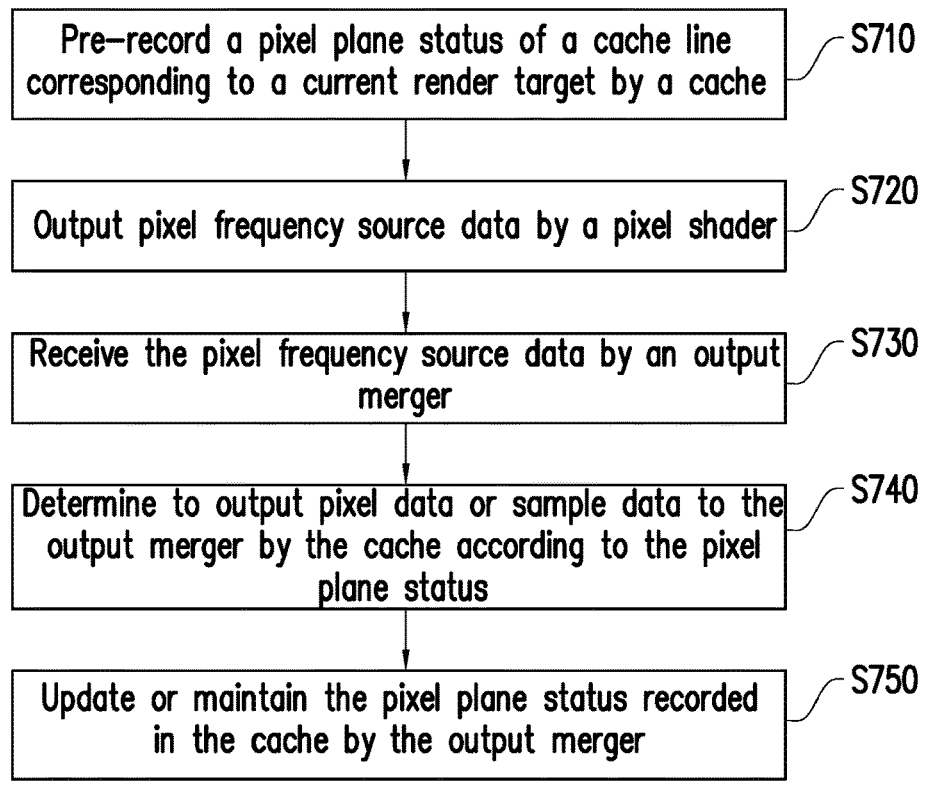
FIG. 7 is a flowchart of an operation method of a graphics processing unit according to another embodiment of the disclosure.

FIG. 7 is a flowchart of an operation method of a graphics processing unit according to another embodiment of the disclosure. With reference to FIG. 6 and FIG. 7, the graphics processing unit 600 may, for example, perform the flows as shown in the embodiment of FIG. 7 to optimize the blending. In step S710, the cache 630 may pre-record a pixel plane status of the cache line 632 corresponding to a current render target. In step S720, the pixel shader 610 may output the pixel frequency source data 605. In step S730, the output merger 620 may receive the pixel frequency source data 605. In step S740, the cache 630 may determine whether to output a pixel data 607 or a sample data 608 to the output merger 620 according to the pixel plane status, where the sample data 608 is a multiple of the pixel data 607. In step S750, the output merger 620 may update or maintain the pixel plane status recorded by the cache 630. In other words, in some cases where the cache 630 determines to output the pixel data 607 to the output merger 620, compared to the cache 130 of FIG. 1, which necessarily provides only the sample data as the data read form, the graphics processing unit 600 of this embodiment optimizes the blending to reduce possible transmission of multiple pieces of identical data between the output merger 620 and the cache 630, which wastes the data transmission bandwidth and the computing resources of the arithmetic logic unit.

Figure 8:
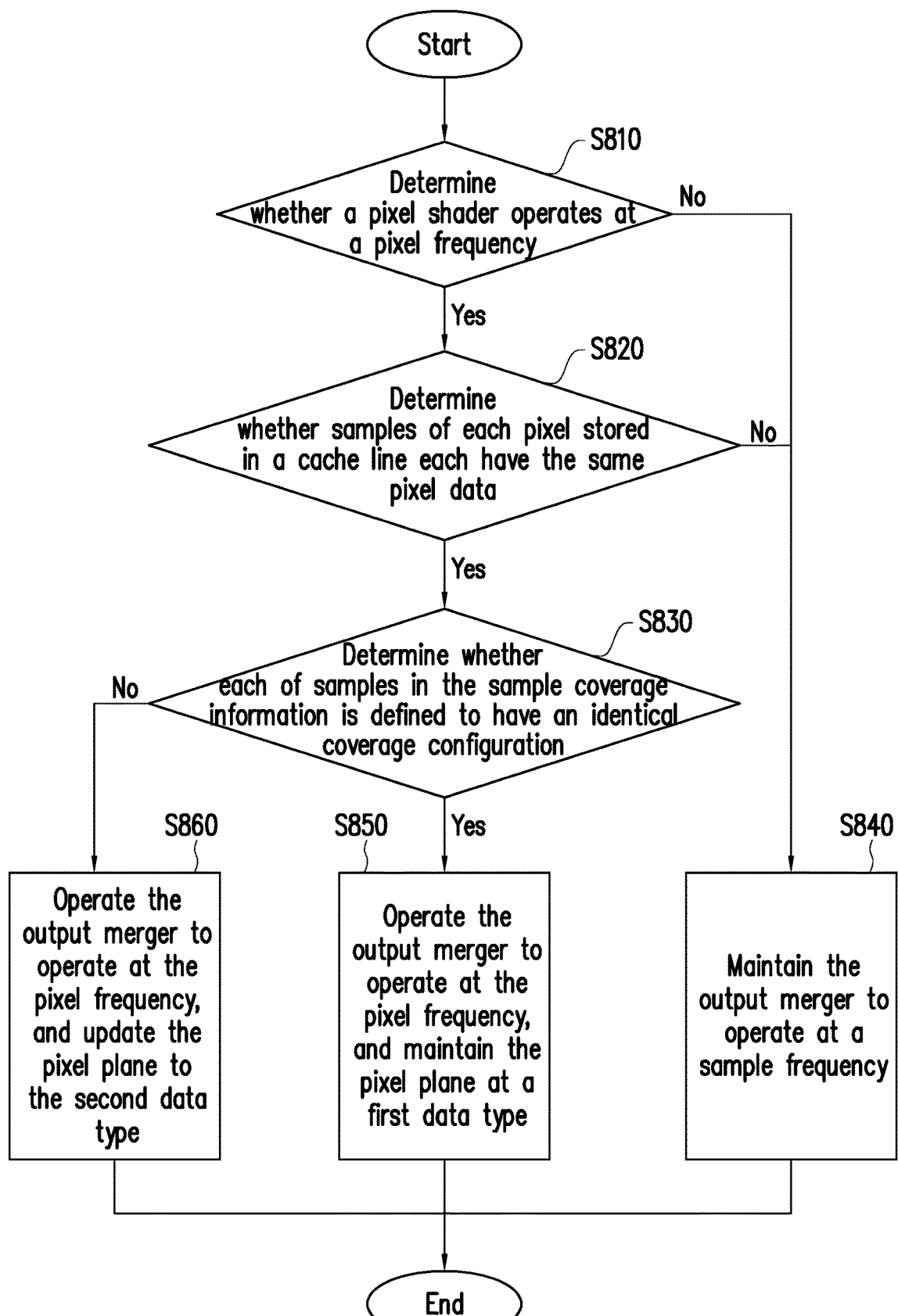
FIG. 8 is a flowchart of a blending optimization control method of a graphics processing unit according to an embodiment of the disclosure.

FIG. 8 is a flowchart of a blending optimization control method of a graphics processing unit according to an embodiment of the disclosure. Steps S810 to S860 of FIG. 8 includes further operation means and descriptions of steps S740 and S750 of FIG. 7 above. With reference to FIG. 6 to FIG. 8, in step S810, the blending optimization control unit 624-1 may determine whether the pixel shader 610 operates at the pixel frequency. If not (indicating operating at the sample frequency), the blending optimization control unit 624-1 executes step S840 to maintain the output merger 620 to operate at the sample frequency. If yes, the blending optimization control unit 624-1 executes step S820, in which the blending optimization control unit 624-1 may determine whether a plurality of samples of each pixel stored in the cache line 632 of the cache 630 each have the pixel data that are identical, and the blending optimization control unit 624-1 may, for example, determine whether the data value of the pixel plane status is "1". If not, the blending optimization control unit 624-1 executes step S840 to maintain the output merger 620 to operate at the sample frequency. If yes, the blending optimization control unit 624-1 executes step S830, in which the blending optimization control unit 624-1 determines whether each of a plurality of samples in the sample coverage information is defined to have an identical coverage configuration, and the blending optimization control unit 624-1 may, for example, determine whether the data value of the coverage extent data is "1". If yes, the blending optimization control unit 624-1 executes step S850, in which the blending optimization control unit 624-1 may operate the output merger 620 to operate at the pixel frequency, and maintain the pixel plane at "1" (the first data type). If not, the blending optimization control unit 624-1 executes step S860, in which the blending optimization control unit 624-1 may operate the output merger 620 to operate at the pixel frequency, and update (with the update information 606) the pixel plane to "0" (the second data type). Therefore, in the graphics processing unit 600 and the operation method thereof of this embodiment, during the computation for pixel data blending by the output merger 620, the data transmission bandwidth occupied between the output merger 620 and the cache 630 and the computing resources of the arithmetic logic unit are effectively optimized.

In summary of the foregoing, in the graphics controllers of the disclosure, the upsample unit is disposed in the cache and/or the blending optimization control unit is disposed in the blending unit of the output merger, combined with the operation methods according to the embodiments of the disclosure, effectively reducing the data traffic of the data bus between the output merger and the cache, and/or saving the computing resources of the arithmetic logic unit in the graphics controllers.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A graphics processing unit, comprising:
    a pixel shader configured to output a pixel data;
    an output merger coupled to the pixel shader and configured to receive the pixel data, wherein the output merger outputs the pixel data and a sample mask corresponding to the pixel data;
    a cache coupled to the output merger and configured to receive the pixel data and the sample mask, wherein the cache generates a sample data according to the pixel data and the sample mask; and
    a memory coupled to the cache, wherein the cache writes the sample data into the memory, and a data size of the sample data is a multiple of a data size of the pixel data.

2. The graphics processing unit according to claim 1, wherein the output merger comprises:
    a color data buffer receiving the pixel data;
    a test unit configured to output sample coverage information; and
    a write back unit coupled to the color data buffer and the test unit,
    wherein the sample coverage information comprises the sample mask, and the output merger outputs the pixel data and the sample mask to the cache by the write back unit.

3. The graphics processing unit according to claim 2, wherein the test unit comprises a depth and transparency test unit.

4. The graphics processing unit according to claim 1, wherein the cache comprises:
    an upsample unit configured to receive the pixel data and the sample mask, and configured to generate the sample data according to the pixel data, the sample mask, and a render target format; and
    a cache line coupled to the upsample unit and the memory and configured to receive the sample data.

5. The graphics processing unit according to claim 4, wherein the upsample unit comprises:
    a data duplication logic receiving the pixel data; and
    a write control logic receiving the sample mask,
    wherein the write control logic controls the data duplication logic to duplicate the pixel data according to the sample mask and the render target format, to generate the sample data and output the sample data to the cache line to wait for being written into the cache.

6. The graphics processing unit according to claim 4, wherein the render target format is provided by the output merger or provided by a render register.

7. The graphics processing unit according to claim 1, wherein the pixel data is a render target data, and one pixel data is $8 \times 2^n$ bits, where n is an integer greater than or equal to 0.

8. The graphics processing unit according to claim 1, wherein the data size of the sample data is determined according to a multisampling anti-aliasing mode and a render target format.

9. The graphics processing unit according to claim 1, wherein the multiple is equal to an amplification multiple of the multisampling anti-aliasing mode.

10. The graphics processing unit according to claim 1, wherein the cache comprises a level 1 cache.

11. An operation method of a graphics processing unit, comprising:
   outputting a pixel data by a pixel shader;
   receiving the pixel data by an output merger;
   outputting the pixel data and a sample mask corresponding to the pixel data by the output merger;
   receiving the pixel data and the sample mask by a cache, and generating a sample data by the cache according to the pixel data and the sample mask; and
   writing the sample data into a memory by the cache, wherein a data size of the sample data is a multiple of a data size of the pixel data.

12. The operation method according to claim 11, wherein the step of outputting the pixel data and the sample mask corresponding to the pixel data by the output merger comprises:
   receiving the pixel data by a color data buffer of the output merger;
   outputting sample coverage information by a test unit of the output merger, wherein the sample coverage information comprises the sample mask; and
   outputting the pixel data and the sample mask to the cache by a write back unit of the output merger.

13. The operation method according to claim 12, wherein the test unit comprises a depth and transparency test unit.

14. The operation method according to claim 11, wherein the step of receiving the pixel data and the sample mask by the cache, and generating the sample data by the cache according to the pixel data and the sample mask comprises:
   receiving the pixel data and the sample mask by an upsample unit of the cache, and generating the sample data by the upsample unit according to the pixel data, the sample mask, and a render target format; and
   storing the sample data by a cache line of the cache.

15. The operation method according to claim 14, wherein the step of receiving the pixel data and the sample mask by the upsample unit of the cache, and generating the sample data by the upsample unit according to the pixel data, the sample mask, and the render target format comprises:
   receiving the pixel data by a data duplication logic of the cache;
   receiving the sample mask by a write control logic of the cache; and
   controlling the data duplication logic by the write control logic of the cache to duplicate the pixel data according to the sample mask and the render target format to generate the sample data, and outputting the sample data to the cache line to wait for being written into the cache.

16. The operation method according to claim 14, wherein the render target format is provided by the output merger or provided by a render register.

17. The operation method according to claim 11, wherein the pixel data is a render target data, and one pixel data is $8 \times 2^n$ bits, where n is an integer greater than or equal to 0.

18. The operation method according to claim 11, wherein the data size of the sample data is determined according to a multisampling anti-aliasing mode and a render target format.

19. The operation method according to claim 11, wherein the multiple is equal to an amplification multiple of the multisampling anti-aliasing mode.

20. The operation method according to claim 11, wherein the cache comprises a level 1 cache.

21. A graphics processing unit, comprising:
   a pixel shader configured to output a pixel frequency source data;
   an output merger coupled to the pixel shader and configured to receive the pixel frequency source data; and
   a cache coupled to the output merger and configured to pre-record a pixel plane status of a cache line corresponding to a current render target,
   wherein the cache determines whether to output a pixel data or a sample data to the output merger according to the pixel plane status, a data size of the sample data is a multiple of a data size of the pixel data, and the output merger updates or maintains the pixel plane status.

22. The graphics processing unit according to claim 21, wherein the output merger comprises:
   a test unit configured to output sample coverage information; and
   a blending unit coupled to the test unit and comprising a blending optimization control unit, wherein the blending optimization control unit is configured to receive the sample coverage information and the pixel frequency source data,
   wherein the blending optimization control unit first determines a coverage extent data according to the sample coverage information and the pixel frequency source data, and the blending optimization control unit then determines a merger status data with the coverage extent data and the pixel plane status and updates the pixel plane status, wherein the merger status data is configured to determine whether the output merger operates at a pixel frequency or a sample frequency.

23. The graphics processing unit according to claim 22, wherein the merger status data is a 1-bit data, the output merger operates at the pixel frequency when the merger status data is of a first data type, and the output merger operates at the sample frequency when the merger status data is of a second data type.

24. The graphics processing unit according to claim 23, wherein the coverage extent data is a 1-bit data, the coverage extent data is of the first data type when each of a plurality of samples in the sample coverage information is defined to have an identical coverage configuration, and the coverage extent data is of the second data type when the samples in the sample coverage information have different coverage configurations.

25. The graphics processing unit according to claim 24, wherein the pixel plane status is a 1-bit data, the pixel plane status is of the first data type when a plurality of samples of each pixel stored in the cache line each have the pixel data that are identical, and the pixel plane status is of the second data type when the samples of each pixel stored in the cache line have the pixel data that are different.

26. The graphics processing unit according to claim 25, wherein the merger status data is of the first data type when the pixel plane status and the coverage extent data are of the first data type,
   the cache returns the pixel plane status of the first data type to the output merger, and the output merger operates at the pixel frequency, and
   the output merger outputs a data with a merging result on a pixel plane to the cache, and the pixel plane status is maintained at the first data type.

27. The graphics processing unit according to claim 25, wherein the merger status data is of the first data type when the pixel plane status is of the first data type and the coverage extent data is of the second data type,
   the cache returns the pixel plane status of the first data type to the output merger, and the output merger operates at the pixel frequency, and
   the output merger outputs a data with a merging result on a pixel plane to the cache, and the pixel plane status is updated to the second data type.

28. The graphics processing unit according to claim 25, wherein the merger status data is of the second data type when the pixel plane status is of the second data type,
   the cache returns the pixel plane status of the second data type to the output merger, and the output merger operates at the sample frequency,
   the output merger outputs a data with a merging result on a sample plane to the cache, and the pixel plane status is maintained at the second data type.

29. The graphics processing unit according to claim 21, wherein the multiple is equal to an amplification multiple of the multisampling anti-aliasing mode.

30. The graphics processing unit according to claim 21, wherein the cache comprises a level 1 cache.

31. An operation method of a graphics processing unit, comprising:
   pre-recording a pixel plane status of a cache line corresponding to a current render target by a cache;
   outputting a pixel frequency source data by a pixel shader;
   receiving the pixel frequency source data by an output merger;
   determining whether to output a pixel data or a sample data to the output merger by the cache according to the pixel plane status, wherein a data size of the sample data is a multiple of a data size of the pixel data; and
   updating or maintaining the pixel plane status by the output merger.

32. The operation method according to claim 31, further comprising:
   outputting sample coverage information by a test unit of the output merger;
   receiving the sample coverage information and the pixel frequency source data by a blending unit of the output merger;
   determining a coverage extent data by a blending optimization control unit of the blending unit according to the sample coverage information and the pixel frequency source data; and
   determining a merger status data with the coverage extent data and the pixel plane status, and updating the pixel plane status by the blending optimization control unit,
   wherein the merger status data is configured to determine whether the output merger operates at a pixel frequency or a sample frequency.

33. The operation method according to claim 32, wherein the merger status data is a 1-bit data, the output merger operates at the pixel frequency when the merger status data is of a first data type, and the output merger operates at the sample frequency when the merger status data is of a second data type.

34. The operation method according to claim 33, wherein the coverage extent data is a 1-bit data, the coverage extent data is of the first data type when each of a plurality of samples in the sample coverage information is defined to have an identical coverage configuration, and the coverage extent data is of the second data type when the samples in the sample coverage information have different coverage configurations.

35. The operation method according to claim 34, wherein the pixel plane status is a 1-bit data, the pixel plane status is of the first data type when a plurality of samples of each pixel stored in the cache line each have the pixel data that are identical, and the pixel plane status is of the second data type when the samples of each pixel stored in the cache line have the pixel data that are different.

36. The operation method according to claim 35, wherein the merger status data is of the first data type when the pixel plane status and the coverage extent data are of the first data type, wherein the operation method further comprises:
   returning the pixel plane status of the first data type to the output merger by the cache, wherein the output merger operates at the pixel frequency;
   outputting a data with a merging result on a pixel plane to the cache by the output merger; and
   maintaining the pixel plane status at the first data type.

37. The operation method according to claim 35, wherein the merger status data is of the first data type when the pixel plane status is of the first data type and the coverage extent data is of the second data type, wherein the operation method further comprises:
   returning the pixel plane status of the first data type to the output merger by the cache, wherein the output merger operates at the pixel frequency,
   outputting a data with a merging result on a pixel plane to the cache by the output merger; and
   updating the pixel plane status to the second data type.

38. The operation method according to claim 35, wherein the merger status data is of the second data type when the pixel plane status is of the second data type, wherein the operation method further comprises:
   returning the pixel plane status of the second data type to the output merger by the cache, wherein the output merger operates at the sample frequency;
   outputting a data with a merging result on a sample plane to the cache by the output merger; and
   maintaining the pixel plane status at the second data type.

39. The operation method according to claim 31, wherein the multiple is equal to an amplification multiple of the multisampling anti-aliasing mode.

40. The operation method according to claim 31, wherein the cache comprises a level 1 cache.

* * * * *